Patented Oct. 14, 1930

1,778,517

UNITED STATES PATENT OFFICE

RAYMOND C. BENNER, OF NIAGARA FALLS, AND ALFRED PAUL THOMPSON, OF JACKSON HEIGHTS, NEW YORK, ASSIGNORS TO GENERAL CHEMICAL COMPANY, OF NEW YORK, N. Y., A CORPORATION OF NEW YORK

METHOD OF IMPROVING THE PROPERTIES OF ACTIVATED BAUXITE AND PRODUCT THEREOF

No Drawing.   Application filed January 21, 1927.   Serial No. 162,569.

This invention relates to a method of increasing the physical strength of activated bauxite and to the product thereof.

Activated bauxite as heretofore known is produced by substantially completely dehydrating the natural mineral bauxite under the influence of heat, and has been adapted to a variety of purposes such as decolorizing, purifying, and absorbent compound for mineral oils and solutions of various organic and inorganic mixtures; or as an agent for the purification of substances of this character by the elimination of sulfur. Moreover, we have discovered that activated bauxite functions as a catalyst to catalyze certain gaseous reactions as for example set forth in our United States application, Serial No. 119,739, dated June 30, 1926, and Serial No. 162,571, dated January 21, 1927.

One of the chief factors in determining the efficiency of the bauxite is considered to be the pore-space of the activated mineral. Activation of the natural mineral results from the liberation of water therefrom, forming a substantially dehydrated and porous material. A high grade activated bauxite has a large portion of pore-space, and in general it may be said that the efficiency is proportional to the pore-space, other conditions remaining the same. However, activated bauxites which have a large proportion of pore-space are normally quite soft and brittle, and crumble badly in the mechanical operations required in their preparation and reactivation. It is the object of our invention to provide a process for increasing the physical strength and resistance to mechanical disintegration of such activated bauxites without decreasing their efficiency as catalysts, adsorbents, decolorizers, and so forth.

According to our invention the activated bauxite is impregnated with salts, particularly nitrates, of the heavy metals and the impregnated product subsequently ignited to artificially produce the oxide of the heavy metal uniformly distributed throughout the bauxite to act as a binder.

For example: British Guiana bauxite activated by igniting to a temperature of about 400-450° C. for four hours to drive out most of the water of hydration has a hardness of about 4, according to the Mohs method and scale, and is quite friable. This product, preferably while still warm from the activating treatment, is covered with a solution of a heavy metal salt, for example, ferric nitrate, and is allowed to stand for 10 to 15 minutes. Preferably the activated bauxite is cooled in vacuo and the impregnating solution introduced without the admission of air. Upon the release of the vacuum, the metal salt solution is forced into the pores of the bauxite by external or atmospheric pressure. The solution is then drained off and the impregnated bauxite is gradually brought up to a temperature of 400-450° C. at which temperature it is ignited for about four hours. The resulting product is found to be much less friable than the unimpregnated bauxite and to have increased in hardness to about 4.5, this representing a very material increase over the untreated bauxite. Likewise the product is found to have a catalytic activity at least equal to if not greater than the unimpregnated substance, and its absorbing efficiency is but slightly less than the untreated material.

The impregnating liquid preferably consists of about a 20-25% solution of the heavy metal salt made up by adding about one pound of the anhydrous metallic salt or its equivalent to three to four pounds of water. While we have specified the use of ferric nitrate as suitable impregnating salt, the sulfate or chloride of iron may be used though slightly less effectively. Likewise the nitrate or sulfate of nickel yield an impregnated product equally as improved as when employing iron salts. Manganese salts are slightly less efficient when the ignition after impregnation is carried on at about 400-450° C. However, if the ignition of the bauxite impregnated with manganese salts is carried on at a higher temperature, i. e., 800-1000° C., the product appears to have the greatest strength of any of the impregnated bauxites. In fact any of the heavy metal salts or combinations thereof which yield an oxide upon ignition may be employed according to our invention, and though we prefer to employ the nitrates and particularly ferric nitrate as being economical to use and most effective, we do not limit ourselves thereto.

The process is applicable to any of the varieties of bauxites which are normally friable and soft upon activation according to the known methods. The impregnated product may be reactivated after use according to the methods heretofore used with very considerably less loss than normally occurs with the unimpregnated bauxite.

We claim:

1. Activated bauxite, structurally strengthened by an oxide of a heavy metal artificially deposited within the pores.

2. Activated bauxite impregnated with an oxide of a heavy metal.

3. Activated bauxite impregnated with an oxide of iron.

4. Activated bauxite prepared by impregnating the dehydrated mineral with a salt of a heavy metal and igniting to artificially produce the oxide of the heavy metal distributed throughout the bauxite, and having a hardness greater than that of the unimpregnated material.

5. The method of increasing the physical strength of activated bauxite which consists in impregnating activated bauxite with a salt of a heavy metal and igniting to artificially produce the oxide of the heavy metal distributed throughout the bauxite.

6. The method of increasing the physical strength of activated bauxite which consists in impregnating activated bauxite with an iron salt and igniting to artificially produce an oxide of iron distributed throughout the bauxite.

7. The method of increasing the physical strength of activated bauxite which consists in impregnating activated bauxite with a solution of iron nitrate and igniting to artificially produce an oxide of iron distributed throughout the bauxite.

8. The method of preparing activated bauxite which consists in activating the natural mineral bauxite, impregnating the activated product with solution of a salt of a heavy metal and igniting the impregnated substance to artificially produce the oxide of the heavy metal distributed throughout the bauxite.

In testimony whereof, we affix our signatures.

RAYMOND C. BENNER.
ALFRED PAUL THOMPSON.